UNITED STATES PATENT OFFICE.

HEINRICH WIELAND, OF MUNICH, GERMANY.

PROCESS OF PRODUCING NOVEL ADDITION COMPOUNDS OF THE DESOXYCHOLIC ACID.

1,252,212.  Specification of Letters Patent.  Patented Jan. 1, 1918.

No Drawing.  Application filed May 16, 1917.  Serial No. 169,110.

*To all whom it may concern:*

Be it known that I, HEINRICH WIELAND, a subject of the German Emperor, and resident of Munich, Germany, have invented certain new and useful Improvements in Processes of Producing Novel Addition Compounds of the Desoxycholic Acid, of which the following is a specification.

My present invention relates to new combinations or addition products of the desoxycholic acid (deoxidized cholic acid) with other substances, and to processes of producing these new combinations.

According to investigations carried out by Strecker, Mylius, Latchinoff, Pregl, and others, it is possible to isolate from ordinary cholic acid, on boiling the same with caustic alkalis, three specific cholic acids, viz. the cholic acid $C_{24}H_{40}O_5$, and two isomeric acids of the composition $C_{24}H_{40}O_4$; the choleic acid having its melting point at from 186 to 187° C. and the desoxycholic acid having its melting point at 172° C.

I have ascertained that the choleic acid is not isomeric with the desoxycholic acid but represents an addition product of sebacic and desoxycholic acids, these constituents uniting in the peculiar proportions of 8 molecules of desoxycholic acid to 1 molecule of sebacic acid. The knowledge thus gained rendered apparent the feasibility of the synthesis of choleic acid by associating desoxycholic acid with sebacic acid. I have further ascertained that besides sebacic acid, it is possible to unite substances of various other groups of bodies with desoxycholic acid to obtain products which are similar to the above-mentioned choleic acid. Thus, I obtained such combinations or addition products with hydrocarbons, alcohols, cyclic carbon compounds such as camphor and phenols, phenol-ethers, aldehydes, ketones, alkaloids, and carboxylic acids and their esters, such as palmitic acid, stearic acid, oleic acid. The three latter carboxylic acids and similar acids and their esters, will be referred to as aliphatic monocarboxylic acid compounds. These stable addition products which do not decompose in solvents and contain the respective components in a fixed stoichiometric proportion, I will designate in general as choleic acids; as, for instance, camphor-choleic acid, phenol-choleic acid, etc.

To produce such choleic acids according to my present invention, the procedure is as follows. The desoxycholic acid is brought into union with the substances with which the cholic acid is to be combined in a suitable solvent or in a state of liquefaction. When solvents are used, I prefer to proceed as follows.

I dissolve one part of desoxycholic acid in three parts of alcohol and heat the solution. I then add to the hot solution the substance to be combined with the desoxycholic acid in a quantity slightly in excess of the requirement. The choleic acid separates from the cold solution by crystallization.

*Example 1.*

Dissolve 5 grams of pure desoxycholic acid in 15 cubic centimeters of hot alcohol. Add .5 grams of stearic acid to the hot solution. During the cooling down of the thus obtained solution there separate by crystallization 4 grams of pure stearic-choleic acid having its melting point at 186° C. By titration with $\frac{n}{10}$ alkali solution and through determination of the content of stearic acid it will be found that 8 molecules of desoxycholic acid unite with 1 molecule of stearic acid.

*Example 2.*

In producing naphthalene-choleic acid proceed as stated in the first example. The naphthalene-choleic acid crystallizes in the form of beautiful needles, is perfectly odorless, and contains 3 molecules of desoxycholic acid to 1 molecule of naphthalene.

Such choleic acids as are soluble in the respective solvents may generally be obtained preferably by proceeding as follows. Dissolve the desoxycholic acid in the fused mass of the substance with which it is to combine, allow the resulting mixture to crystallize, and remove the excess of the participating substance by means of a suitable solvent.

*Example 3.*

To produce phenol-choleic acid, add desoxycholic acid to 20 grams of fused phenol as long as the dissolving action proceeds. Allow the mass to cool down, and boil away the excess of phenol by means of petroleum-ether. The remaining phenol-choleic acid is perfectly odorless, may be recrystallized by means of a small quantity of alcohol, and has its melting point at 165° C. Phenol-choleic acid is capable of producing a barium salt or calcium salt which is difficult to dissolve.

Example 4.

To produce benzaldehyde-choleic acid, dissolve desoxycholic acid at approximately 100° C. in benzaldehyde until the solution is saturated; remove the excess of benzaldehyde by means of petroleum-ether. The beautifully crystallizing benzaldehyde-choleic acid contains both components in a firm union, the proportion being 3 molecules of desoxycholic acid to 1 molecule of benzaldehyde. In the compound the benzaldehyde is indifferent to the oxygen of the air. The melting point is at 168° C.

The novel products designated herein as choleic acids are intended to be employed for pharmaceutical purposes.

What I claim is:

1. A process of producing addition products of desoxycholic acid with another organic substance, which comprises dissolving one component in a solvent, heating the resulting solution, and adding thereto the other component.

2. A process of producing addition products of desoxycholic acid with another organic substance, which comprises dissolving one component in alcohol, subjecting the thus obtained solution to a heating action, and adding the other component thereto.

3. A process of producing combinations of desoxycholic acid with another organic substance, which comprises dissolving desoxycholic acid in the liquefied organic substance, the latter being in excess of that theoretically required, and removing said excess by means of a solvent.

4. The process of producing a combination of desoxycholic acid and a cyclic carbon compound which comprises mixing desoxycholic acid with the cyclic carbon compound in the presence of a solvent.

5. A process of producing a phenol-choleic acid, which comprises liquefying phenol, adding to said liquefied phenol desoxycholic acid, and removing the excess of phenol by means of a solvent.

6. A synthetic choleic acid, being a combination of desoxycholic acid and a cyclic carbon compound in stoichiometric proportions.

7. A synthetic choleic acid, beng a combination of desoxycholic acid and an oxygen-containing cyclic carbon compound in stoichiometric proportions.

8. A synthetic choleic acid, being a combination of desoxycholic acid and an aromatic compound in stoichiometric proportions.

9. A synthetic choleic acid, being a combination of desoxycholic acid and an oxygen-containing aromatic compound in stoichiometric proportions.

10. Phenol-choleic acid, being a combination of desoxycholic acid and phenol and having a melting point of about 165° C.

In testimony whereof I have signed my name to this specification in the presence of two subscribing witnesses.

HEINRICH WIELAND.

Witnesses:
  W. SPIEGELBERG,
  A. DE OLEA.